Patented Sept. 22, 1936

2,054,873

UNITED STATES PATENT OFFICE 2,054,873

MANUFACTURE OF MAPLE PRODUCTS OF INTENSE FLAVOR

George Stafford Whitby, Rockcliffe, Ottawa, Ontario, Canada

No Drawing. Application April 21, 1934, Serial No. 721,717

6 Claims. (Cl. 127—30)

This invention relates to the manufacture of maple products having a high content of true maple flavour and particularly to a method whereby the flavour-producing constituents are largely or entirely preserved during concentration and thereafter developed to impart in high degree to the product the desired true maple flavour characteristic.

During the concentration of maple sap to syrup and sugar as ordinarily practiced, in open evaporators, a substantial part of the available delicate maple flavour is lost or destroyed. This is manifest by the strong maple odor which pervades the boiling house in a sugar camp and is indicative of loss by volatilization. Furthermore, the maple flavour as such appears not to be present in maple sap, since, if such sap is concentrated to syrup at a low temperature, as by evaporation under reduced pressure, the syrup is substantially lacking in maple flavour.

The chief object of the present invention is to preserve in maple products the flavour-producing constituent or constituents and to develop or utilize them in imparting to the finished product the full, rich flavour which may be obtained therefrom. A further object is to provide a process whereby the flavour-producing constituents in a maple product may be developed so that they will exert their full influence in imparting flavour to the product. A still further object of the invention is to provide a process of concentrating maple sap or syrup without substantial loss of the flavour-producing constituents and then developing those constituents to impart their influence to the final product.

In accordance with the invention the desired flavour of any maple product which contains some or all of the original flavour-producing constituents may be substantially improved by heating the product to a temperature above its boiling point, or, if it is a solid (sugar), to a temperature above the boiling point of its solution in water. For example, if a flavourless, vacuum-concentrated syrup is heated in a closed vessel at a temperature above its boiling point, there is developed in it a maple flavour substantially more intense than that present in syrup prepared in the usual way in open evaporators. Similarly a syrup or sugar produced by any type of concentration which does not destroy or remove all of the flavour-producing constituents, may be improved in flavour by heating to a temperature which will release therein or develop the flavour in these constituents. The temperature to which the product is heated must be higher than its boiling point. With syrup this involves the use of a closed container which avoids volatilization and loss of desired constituents as well as further concentration.

The following is an example of the application of the invention to sap.

Freshly collected maple sap, preferably not over a day old, is placed in a modern efficient evaporator and speedily concentrated to about 10 to 35% of solids. How far the sap should be concentrated at this stage depends on the season and the quality of the run. Generally, early sap in a good season can be concentrated in the evaporator to the higher degree, and vice versa. The partially concentrated maple sap (or, if desired, the original sap) is placed in a vacuum pan and concentrated to, say, 65 to 70% of solids at a temperature generally in the neighborhood of 50° C. The sap concentrated in this way has no, or very little, maple flavour. To develop the flavour the concentrated sap is transferred to an autoclave with a stirrer and is heated to a temperature higher than the boiling point of maple syrup of the same density, and suitably between 120° and 150° C. Generally the higher the temperature applied, the shorter is the time required to develop the flavour or release and make it effective in the product. Preferred results are usually obtained when the syrup is heated for 30 to 60 minutes at 135° C. The syrup is now filtered in order to remove suspended insoluble particles of inorganic salts, such as calcium malate and other impurities.

It is apparent that in commercial operation it is not practicable to concentrate the fresh sap under low temperatures in vacuum concentrators, yet substantial concentration may be effected, in the manner indicated, in open evaporators without undue loss of the flavour-producing constituents. When so treated the partially concentrated product may be further concentrated to the desired degree in vacuum evaporators, still avoiding the use of unduly high temperatures.

The reason for the peculiar effectiveness of the process is not fully understood, but it may be due to the presence in sap and other maple products derived therefrom of a precursor or precursors from which, or by the action of which, the true maple flavour is developed. There is some evidence which goes to indicate that there is a flavour precursor in sap and a precursor which does not appear until the sap is substantially concentrated and that the influence of these combined under relatively high temperature is responsible for the characteristic maple flavour. A factor influencing the formation of precursor during the concentration of sap is probably the hydrogen ion concentration, which has been found to undergo change in the course of concentration. However, whatever the underlying theory may be, it has been found that the process herein described produces products unusually rich in the delicate maple flavour so highly desired in such products.

The process is applicable to the production of improved maple syrup or sugar, as well as flavouring products for ice cream, soft drinks and other foods or beverages.

I claim:

1. A process of producing maple products of intense maple flavour which comprises evaporating at normal pressure maple sap to a concentration of 10 to 35% solids, further concentrating in a vacuum pan at a temperature not substantially exceeding about 50° C. and thereafter heating the product in a closed vessel to a temperature of 120 to 150° C.

2. A process of producing maple products of intense maple flavour which comprises concentrating maple solutions to a desired degree without substantial loss of flavour-producing constituents and thereafter heating without further concentration the concentrated product to a temperature in excess of 104° C.

3. In the production of maple products of intense maple flavour, the step which comprises heating the product in aqueous fluid form to a temperature in excess of its boiling point.

4. In the production of maple products of intense maple flavour, the step which comprises heating maple products in aqueous fluid form having undeveloped maple flavour to a temperature of 120 to 150° C. in a closed vessel.

5. A process of producing maple products of intense maple flavour which comprises concentrating a maple solution at a temperature less than its boiling point at normal pressure and thereafter subjecting the concentrated product to heat at a temperature in excess of its boiling point in a closed vessel.

6. A process of producing maple products of intense maple flavour which comprises the application without concentration of temperatures in excess of 104° C. to maple products in aqueous fluid form substantially free from maple flavour but containing the original natural flavour-producing constituents.

GEORGE STAFFORD WHITBY.